United States Patent Office 3,109,021
Patented Oct. 29, 1963

3,109,021
PROCESS FOR PREPARING POLYMERIZABLE
ALKYLMERCAPTOALKYL ESTERS
Arvid Ek, Shaler Township, Allegheny County, Pa.,
assignor to Gulf Research & Development Company,
Pittsburgh, Pa., a corporation of Delaware
No Drawing. Filed Aug. 7, 1961, Ser. No. 129,503
4 Claims. (Cl. 260—486)

This invention relates to a process for preparing alkylmercaptoalkyl esters of polymerizable alpha,beta-ethylenic monocarboxylic acids.

It has previously been proposed to prepare alkyl esters of polymerizable alpha,beta-ethylenic monocarboxylic acids, such as acrylic or methacrylic acids, by transesterification of a lower alkyl ester of such acid with a higher boiling alkanol, in the presence of transesterification catalysts, such as alkali metal alkoxides, and in the presence of polymerization inhibitors, such as hydroquinone or phenylenediamine. However, this procedure is not fully satisfactory as applied to the preparation of alkylmercaptoalkyl esters of polymerizable alpha,beta-ethylenic monocarboxylic acids by transesterification of lower alkyl esters of such acids with alkylmercaptoalkanols, as conventional alkali metal transesterification catalysts and acidic transesterification catalysts as well, fail to produce satisfactorily high yields of the desired product. In the case of alkali metal catalysts, the catalyst itself tends to react with the unsaturated component of the reaction mixture, hereby increasing the formation of by-products with a corresponding reduction in effective catalyst concentration and yields of the desired product. On the other hand, conventional acidic transesterification catalysts, for example, p-toluene sulfonic acid, appear not to promote effectively formation of the desired alkylmercaptoalkyl ester monomer.

It has been found that the above-indicated difficulties can be avoided by the use of certain polyvalent metal alkoxide transesterification catalysts rather than conventional alkali metal or acidic transesterification catalysts. Unfortunately, however, the use of such catalysts does not fully solve the problem, as it has been found that conventional polymerization inhibitors do not produce fully satisfactory results when employed in conjunction with the effective polyvalent metal alkoxide transesterification catalysts. Thus, in the case of conventional polymerization inhibitors such as hydroquinone and alkoxyphenols, it has been found that the yields of the desired esters are disappointing, not withstanding the use of an effective polyvalent metal alkoxide catalyst, and that product recovery is complicated by the presence of either a precipitate or at least a dark, viscous residue. It is thought that these difficulties may result from a reduction in the effective concentration of both the transesterification catalyst and the polymerization inhibitor through interreaction or complex formation. The loss of effective catalyst concentration to a side reaction is undesirable, since, at the very least, the use of substantially greater quantities of catalyst would be required to achieve suitable results. However, catalyst loss due to complex formation is further objectionable by reason of the formation of the aforesaid undesirable precipitate in the case of polyhydric phenols such as hydroquinone and/or the formation of objectionable amounts of a dark, viscous residue in the case of monohydric phenols, such as ethoxyphenol. The substitution of nitrogenous polymerization inhibitors such as phenothiazine or p-phenylenediamine for the conventional phenolic polymerization inhibitors referred to above may or may not avoid complex formation, but in any event does not achieve the desired ultimate results. The effectiveness of nitrogenous inhibitors may be hampered by the fact that nitrogen, particularly in amino form, is known to promote polymerization in the presence of thioether functional groups of the kind present in the alkylmercaptoalkanol substituent of the reaction mixture. Alternatively, it may be that nitrogenous polymerization inhibitors are simply not very good for the purposes of the particular reaction under discussion.

The present invention relates to an improved process for preparing alkylmercaptoalkyl esters of polymerizable alpha,beta-ethylenic monocarboxylic acids wherein side reactions are minimized and yields of the desired alkylmercaptoalkyl ester monomer are relatively large. It has been found that the difficulties previously discussed at length can be minimized by effecting ester interchange between an alkylmercaptoalkanol containing 3 to 30 and preferably 8 to 15 carbon atoms and an ester of a polymerizable alpha,beta-ethylenic monocarboxylic acid and a monohydric alcohol that is lower boiling than the alkylmercaptoalkanol employed in the reaction, in the presence of a combination of a catalytic amount of a polyvalent metal alkoxide transesterification catalyst, particularly titanium alkoxide catalysts, and a small amount, sufficient to inhibit polymerization of the polymerizable components in the reaction mixture, especially the reaction product, of an at least partially hindered phenol having at least one, and preferably two, ortho hydrocarbon substituents that contain more than one carbon atom. Excellent results have been obtained by the use of a combination of 0.1 to 2 percent by weight of the reaction mixture of titanium tetrabutoxide as the transesterification catalyst and about 0.3 to 5 percent of a hindered phenol polymerization inhibitor having 2 ortho hydrocarbon substituents containing more than one carbon atom, such as 2,6-di-tert-butyl-4-methylphenol, but greater or smaller amounts of these or other polyvalent metal alkoxide transesterification catalysts and other hindered or partially hindered phenol polymerization inhibitors disclosed herein can be used with good results, although at some sacrifice in improvement of ultimate yields of the desired alkylmercaptoalkanol monomer in the case of alkoxides of metals other than titanium and/or in the case of partially hindered phenols. Examples of other polyvalent metal alkoxides whose use is included by this invention are titanium tetraisopropoxide, titanium tetraethoxide and titanium tetramethoxide. Other examples of polyvalent metal alkoxide transesterification catalysts whose use is included by this invention are, in approximate order of preference, zirconium, aluminum, tin, lead, and zinc, butoxides, propoxides, ethoxides, and methoxides. Alkoxides of the above-indicated metals and the alkylmercaptoalkanol employed in the transesterification and other alkanols also can be used with good results. Examples of other hindered phenols whose use is included by this invention are 2,4,6-tri-tert-butylphenol, 2,6-di-tert-butyl-4-phenyl phenol, and 2,6-di-sec-butyl-4-methylphenol. Examples of partially hindered phenols that can be used are 2-tert-amyl-4-methylphenol, 3-methyl-6-tert-butylphenol, 2-methyl-4,6-di-tert-butylphenol, and 2,4-di-tert-butylphenol. Although the invention is useful in transesterification involving any of the alkylmercaptoalkanols of the class indicated above, it is especially advantageous in the case of higher alkylmercaptoalkanols, for example those containing at least 8 carbon atoms, as transesterification reactions involving these materials require the use of higher distillation temperatures which, in turn, are more conducive to polymerization, as a consequence of which losses of the desired alkylmercaptoalkanol monomer to polymerization are more likely to be encountered. Specific examples of alkylmercaptoalkanols with which the invention is especially useful are beta-dodecylmercaptoethanol and beta-iso-octylmercaptoethanol. Examples of other alkylmercaptoalkanols with which the invention can be used are beta-heptylmercaptoethanol, 12-dodecylmercaptododecanol, gamma-docosylmercaptopropanol, beta-octacosylmercaptoethanol, beta-ethylmercaptoethanol and beta-methylmercaptoethanol. In carrying out the transesterification reactions of this invention we prefer to employ methyl methacrylate as the polymerizable alpha, beta-unsaturated ester, as the reaction can be conveniently driven toward completion by removal at relatively low temperatures of the unreacted ester and methyl alcohol liberated in the ester interchange reaction, thereby minimizing losses due to polymerization of the desired alkylmercaptoalkyl ester monomer. However, the invention is not limited to the use of methyl methacrylate, and there can be used esters of other monohydric alcohols that are lower boiling than, that is, that contain at least one less carbon atom than, the alkylmercaptoalkanol employed in the reaction, and other polymerizable ethylenic monocarboxylic acids. For example, there can be used the ethyl, propyl, butyl, iso-octyl, and lauryl esters of acrylic or lower alpha-alkacrylic acids such as methacrylic acid or other lower, i.e., $C_{3-5}$, polymerizable alpha,beta-unsaturated monocarboxylic acids such as crotonic, angelic, tiglic, and senecioic acids.

The reaction conditions and proportions employed in the transesterification reactions of this invention are conventional and therefore need not be described in detail. However, in the interest of clarity it may be mentioned that the alkylmercaptoalkanol and the polymerizable alpha,beta-unsaturated monocarboxylic acid ester monomer can be employed in any suitable proportions with respect to one another. Thus, either the alkylmercaptoalkanol or the ester monomer may be employed in excess, or they can be employed in equivalent proportions. We prefer to employ the ester monomer in excess for reasons of economy as the alkylmercaptoalkanol is the more costly reactant, and in any event, the unreacted ester monomer can be recovered practically quantitatively and reused, if desired. Temperatures over a wide range are used with success in transesterification reactions. Thus, ester interchange will take place to some degree at ordinary ambient atmospheric temperatures. However, in order to accelerate the reaction, some heating is normally desirable, and in order to drive the reaction toward completion, temperatures in excess of the boiling point of the relatively low boiling alcohol liberated in the transesterification reaction should be used. Thus, where methanol is the alcohol liberated during transesterification, the completion of the reaction is favored by the use of an ultimate reaction temperature sufficient to distill off the methyl alcohol. The transesterification reaction as such will take place at ordinary ambient atmospheric pressures, and distillation to remove alcohol liberated in the reaction can be carried out at atmospheric pressures when the liberated alcohol is sufficiently low boiling that no significant losses of the desired alkylmercaptoalkyl ester monomer are suffered by polymerization. However, where reaction or distillation temperatures are employed sufficient to favor significant losses to polymerization, reaction pressures less than one atmosphere are desirable in order to effect a corresponding reduction in such temperatures. The time required for the transesterification reaction to be completed will depend to an important extent upon the nature and proportions of the reactants employed, the nature and amount of the transesterification catalyst and the reaction temperature. When using preferred transesterification conditions, reactant proportions, catalysts and temperatures, we have found that substantial completion can be obtained in about one to three hours. When the factors named above are varied, longer or shorter reaction times, for example 30 minutes to 10 hours, can be used.

As indicated, the amount of polyvalent metal alkoxide transesterification catalyst can vary substantially. Normally, there is used the smallest amount compatible with a reasonable transesterification reaction rate. For the preferred alkylmercaptoalkanols and polymerizable alpha, beta-ethylenic monocarboxylic acid ester monomers and for reaction times in the neighborhood of about two or three hours, we have found transesterification catalyst proportions in the range of about 0.1 to 2 percent to produce excellent results. From a purely chemical standpoint, substantially larger amounts, up to 10 percent or more by weight of the reaction mixture can be used, but the use of such greater proportions normally effects no additional advantage, as such proportions do not markedly increase the reaction rate and as they involve unnecessary extra cost and unnecessary contamination of product, since the excess catalyst is not recovered as such. Although amounts less than 0.1 percent transesterification catalysts can be used, we prefer not to employ less than about 0.05 percent by weight of the reaction mixture, in view of the relatively lower reaction rates obtained thereby and since with such small amounts of catalyst the transesterification reaction is rendered much more sensitive to the deteriorative effect of traces of water in the reactants.

Similarly as in the case of the transesterification catalysts, we prefer to employ the polymerization inhibitor in the minimum proportion sufficient to avoid undue losses of the desired alkylmercaptoalkyl ester monomer to polymerization. As indicated previously, when using the preferred reactants and polymerization inhibitor, excellent results have been obtained with inhibitor proportions in amounts of about 0.3 to 5 percent by weight of the reaction mixture. Although smaller proportions can be used, amounts less than about 0.1 per cent by weight of the reaction mixture are normally avoided, as such proportions will result in a noticeable reduction in yields of the desired sulfur-containing monomer. On the other hand, while amounts substantially larger than 5 percent can be used, for example, up to 10 percent or more by weight of the reaction mixture, such larger amounts normally do not effect a proportionate increase in yields of the desired sulfur-containing monomer, and in addition, can be undesirable if they are distilled over with the sulfur-containing monomer, as in such instances polymerization of the monomer is interfered with.

The process of this invention can be further understood by reference to the following specific embodiment. Beta-dodecylmercaptoethyl methacrylate monomer is prepared by causing 73.8 grams (0.3 mole) of beta-dodecylmercaptoethanol to react with 90 grams (0.9 mole) of methyl methacrylate in the presence of 1.3 grams (0.8 percent by weight of the reaction mixture) of titanium tetrabutoxide as a transesterification catalyst and two grams (1.2 percent by weight of the reaction mixture) of 2,6-di-tert-butyl-4-methylphenol as a polymerization inhibitor, in a glass vessel to distillation temperature. Nitrogen is bubbled through the reaction mixture throughout the reaction period. An azeotrope of methyl alcohol and methyl methacrylate is distilled off at about 62–63° C. at atmospheric pressure. When this fraction has been completely distilled, that is, after about one hour, excess methyl methacrylate is distilled off at 80 mm. Hg at 40° C. This fraction is then followed by a small fraction boiling up to 95° C. at 10 mm. Hg. Beta-dodecylmercaptoethyl methacrylate monomer is then distilled off at a temperature of about 168–178° C. at about 1.5 mm. Hg and recovered in an amount equal to 82 percent of theoretical.

The process of this invention is not limited to the particular reactants and catalysts employed in the preceding specific embodiment, and other reactants and catalysts disclosed herein can be employed in the same or equivalent proportions. Thus, instead of beta-dodecylmercaptoethanol there can be used beta-methylmercaptoethanol beta-ethylmercaptoethanol, and beta-hexylmercaptohexanol and the like. For the methyl methacrylate there can be substituted ethyl, propyl, and butyl acrylates and methacrylates, provided the alcohol liberated during transesterification is lower boiling than the alkylmercaptoalkanol employed in the reaction. Similarly, for the transesterification catalyst and polymerization inhibitor employed in the preceding embodiment, there can be used, respectively, titanium tetramethoxide, tetraethoxide, tetrapropoxide or other polyvalent metal alkoxide transesterification catalysts of the class disclosed herein and 2,4,6-tritert-butylphenol, 2,6-di-tert-butyl-4-phenylphenol, 2,6-di-sec-butyl-4-methylphenol or other polymerization inhibitors of the class disclosed herein.

When the alkylmercaptoalkanols employed in the process of this invention are not commerically available, they can be conveniently prepared by condensation of an appropriate halogen-substituted monhydric alcohol with an alkali metal mercaptide containing the desired number of carbon atoms.

The alkylmercaptoalkyl esters formed in the herein-disclosed process are useful as intermediates in the preparation by conventional methods of oil-soluble sulfur-containing polymers and copolymers, which, in turn, are useful as thermal stabilizers in hydrocarbon distillate fuels boiling in the aviation turbine fuel range and as detergents in hydrocarbon oil lubricants, as described and claimed in copending application Serial No. 129,554, filed August 7, 1961, and Serial No. 129,551, filed August 7, 1961. Thus, a jet fuel containing 20 pounds per thousand barrels of a beta-dodecylmercaptoethyl methacrylate homopolymer, prepared by polymerizing 250 grams of the corresponding monomer (prepared as described above) in the presence of 1.5 gram alpha, alpha'-azodiisobutyronitrile in 500 grams of a light lubricating oil, for six hours under an atmosphere of nitrogen, was found to resist filter plugging when subjected to a temperature of 500° F. under the conditions of the standard CFR Fuel Coker Test for jet fuels. In contrast, the uninhibited fuel permitted relatively rapid filter plugging.

Numerous modifications and variations of the invention as herein set forth can be resorted to without departing from the spirit or scope thereof. Accordingly, only such limitations should be imposed as are indicated in the claims appended hereto.

I claim:

1. A process for preparing a polymerizable alkylmercaptoalkyl ester, comprising effecting ester interchange between an alkylmercaptoalkanol containing 3 to 30 carbon atoms per molecule and an ester of a polymerizable alpha, beta-ethylenic monocarboxylic acid and a monohydric alcohol that is lower boiling than said alkylmercaptoalkanol, in the presence of a combination of a catalytic amount of at least one transesterification catalyst selected from the group consisting of alkoxides of titanium, zirconium, aluminum, tin, lead, and zinc, and a small amount, sufficient to inhibit polymerization of the polymerizable components of the reaction mixture of an at least partially hindered phenol having at least one ortho hydrocarbon substituent that contains more than one carbon atom, and recovering a monomeric alkylmercaptoalkyl ester of said alpha,beta-ethylenic monocarboxylic acid.

2. A process for preparing a polymerizable alkylmercaptoalkyl ester, comprising effecting ester interchange between an alkylmercaptoalkanol containing 8 to 15 carbon atoms and an ester of a lower, polymerizable alpha-beta-ethylenic monocarboxylic acid and a monohydric alcohol that is lower boiling than said alkylmercaptoalkanol, in the presence of a combination of a catalytic amount of a titanium alkoxide, and a small amount, sufficient to inhibit polymerization of the polymerizable components of the reaction mixture of a hindered phenol having two ortho hydrocarbon substituents having more than one carbon atom each, and recovering a monomeric alkylmercaptoalkyl ester of said lower, polymerizable alpha,beta-ethylenic monocarboxylic acid.

3. The process of claim 2 where said titanium alkoxide it titanium tetrabutoxide, and where said hindered phenol is 2,6-di-tert-butyl-4-methylphenol.

4. The process of claim 2 where said catalytic amount is 0.1 to 2 percent by weight of the reaction mixture, and said small amount is 0.3 to 5 percent by weight of the reaction mixture.

References Cited in the file of this patent

UNITED STATES PATENTS

| 2,704,770 | Anspon | Mar. 22, 1955 |
| 2,822,348 | Haslam | Feb. 4, 1958 |
| 2,891,990 | Mulvany et al. | June 23, 1959 |
| 2,891,991 | Stewart et al. | June 23, 1959 |
| 2,925,406 | McCurdy et al. | Feb. 16, 1960 |

OTHER REFERENCES

Rosenwald et al.: Ind. and Eng. Chemistry 42, 162–165 (1950).